Feb. 2, 1932.  W. O. BICKERSTAFF  1,843,537
GRIPPING DEVICE
Filed Feb. 6, 1931
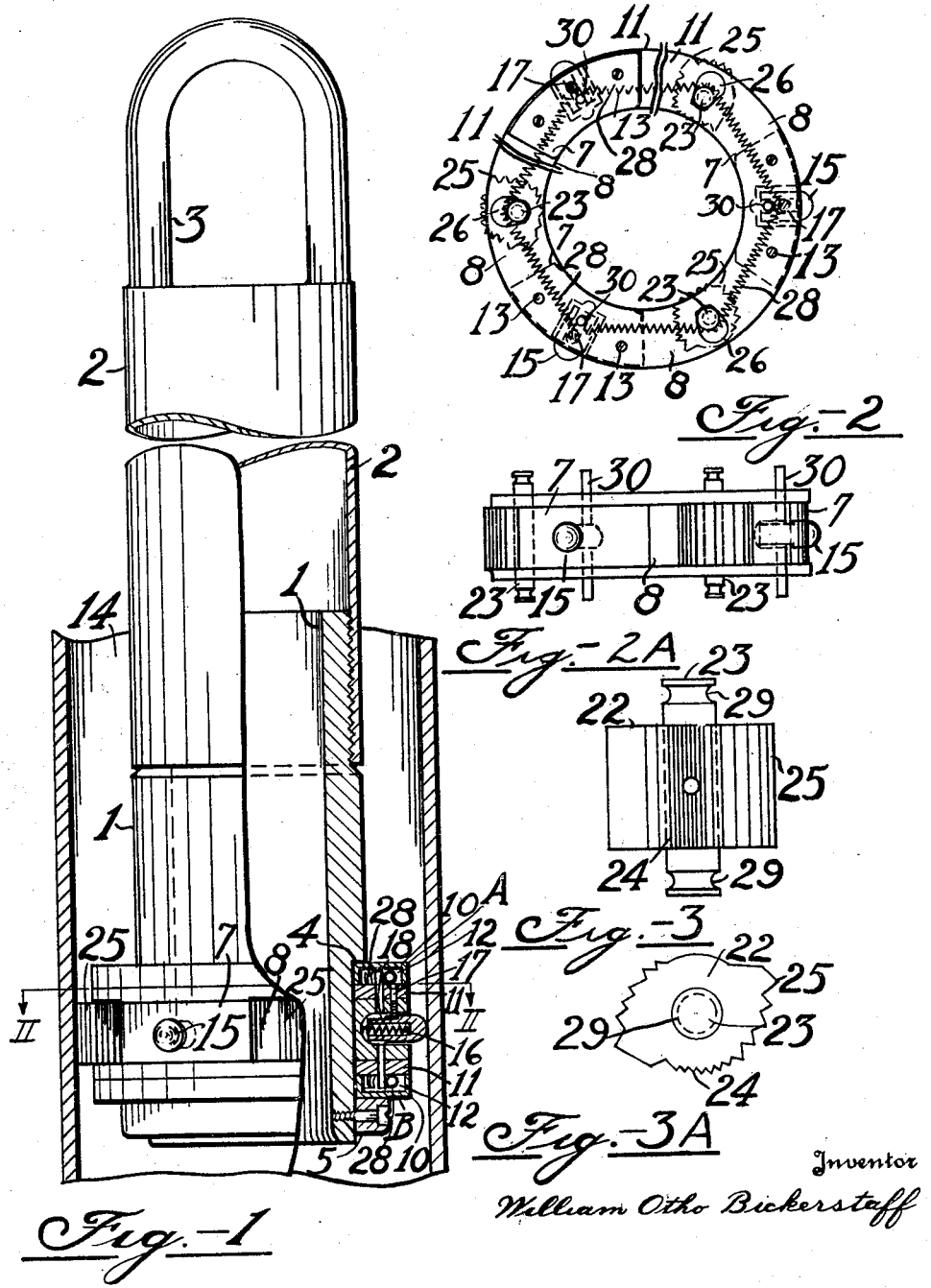

Patented Feb. 2, 1932

1,843,537

UNITED STATES PATENT OFFICE

WILLIAM OTHO BICKERSTAFF, OF SMITHVILLE, WEST VIRGINIA

GRIPPING DEVICE

Application filed February 6, 1931. Serial No. 514,028.

This invention relates to improvements in gripping devices of the type known as back-up tools or wrenches adapted for operation upon tubular members. The invention will be fully understood from the following description taken in connection with the accompanying drawings in which latter—

Fig. 1 is a side elevational view of the device with parts broken away positioned in a casing shown in longitudinal section;

Fig. 2 is a transverse sectional view taken along the line II—II of Fig. 1; and Fig. 2A is a view in elevation of Fig. 2;

Fig. 3 is a front elevational view of a cam member; and Fig. 3A is a top view of Fig. 3.

Referring particularly to the drawings, a tubular mandrel is shown comprising sections 1 and 2 which are secured together by means of screw threads and are locked in secured position by means of a set screw, not shown. A number of sections 2 can be provided if desired to increase the length of the mandrel. Sections 1 and 2 can be secured together by welding and some of the advantages of the invention will be retained. A U shaped member 3 is affixed rigidly to the end of section 2 and provides a means whereby the mandrel can be handled and whereby the device can be engaged by tongs or the like either to prevent turning of the device or to turn the device according to the use to which it is to be put. Section 1 is annularly inset at one end to provide a shoulder 4. The inset end is adapted to receive rotatably a tubular head which is adapted to bear against shoulder 4 and which is retained in position by means of a collar 5. The collar is threaded upon the section 1 and is locked in position by means of a set screw.

The head comprises annular housings A and B which are secured together in spaced relation by means of spacer blocks 7. Spacer blocks 7 are disposed in spaced relation to each other to provide openings 8 which open axially through the head. In the embodiment illustrated there are three spacer blocks 7 and three openings 8. Housings A and B each comprise an annular member 10 having a laterally facing annular groove which is closed by an annular plate 11 to form an annular chamber 12. Housings A and B are secured to the spacer blocks 7 by means of set screws 13 which extend through the annular members 10 into the spacer blocks.

Holding means protrude yieldably from the periphery of the spacer blocks into position to engage the work such as a well casing 14. Each holding means is disposed in a recess in the spacer block and includes a thimble 15. Each thimble opens into the recess and is forced yieldably outwardly from the recess by means of a coil spring 16 which engages the base of the recess and the interior of the thimble. Outward movement of the thimble through the spacer block is limited by means of a set screw 17 which extends through plate 11 and into position to abut against a stop 18 which protrudes radially from the side wall of the thimble. The thimbles are thus forced outwardly and will engage the inner walls of a casing such as casing 14 with sufficient pressure to prevent rotation of the head with respect to the casing under limited pressure.

Cam members or dogs are disposed in the openings 8 and function as gripping means operative against the mandrel and the inner walls of the casing. Each cam member comprises a body portion 22 mounted upon a shaft 23 substantially parallel with the axis of the head. The periphery of the body portion is provided with a low spot 24 and a high spot 25 and is preferably toothed or otherwise roughened to provide a gripping surface. The shaft 23 of the cam member protrudes through holes 26 in plates 11 and the ends of the shaft extend into the annular chamber 12 of housings A and B. The holes 26 are of larger diameter than the diameter of the shafts 23 and therefore permit play of the cam members radially of the head. The cam members are normally held yieldably in engagement with the surface of the mandrel by means of coil springs 28 one of which is positioned within each annular chamber 12 and which extends longitudinally throughout the extent of the chamber. The coil springs engage the outer surface of the shafts 23 and are positioned within an annular groove 29 in the surface of each shaft. Supporting pins 30 support the coil springs 28 intermediate the shafts 23. The mandrel is provided with a roughened or knurled surface in position to be engaged by the roughened surfaces of the cam members.

The device can be utilized as a back-up tool when it is desired to unscrew an upper casing from a string of lower casings in an oil well. When utilizing the device for such a purpose the mandrel is lowered within an upper section of casing until the head is disposed in position to engage the next lower section of casing. The head is held against rotation with respect to the lower casing while engaging the cam members with the casing by means of the protruding thimbles which engage against the inner surface of the lower casing. The mandrel is then caused to be rotated in a direction to cause the cam members to be rotated about their axes and successively higher portions of the cam members thus engage the roughened surface of the mandrel and at the same time successively higher portions of the cam members are caused to be protruded from the head and into engagement with the inner surface of the casing thereby locking the mandrel to the casing. The mandrel is then secured in fixed position by means of a bar or the like inserted through the U shaped end of the mandrel thereby holding the lower section of casing against rotation. The upper section of casing can then be unscrewed from the lower section of casing. The back-up device can be loosened from the lower section of casing by rotating it in the reverse direction thereby loosening the engagement of the cam members against the casing and permitting withdrawal of the device from the casing.

While the device has been described as used more particularly as a back-up device for well casings, it will be understood that it can be used as a wrench for unscrewing casings or for similar applications. The device is preferably of tubular form and can therefore be used for operating upon the outer of the two telescoping casings by disposing it around the inner casing.

Various changes may be made within the scope of the appended claims in which it is desired to claim all novelty inherent in the invention as broadly as the prior art permits.

I claim:

1. A back-up tool for casings, comprising a mandrel, a head associated with and rotatable with respect to the mandrel, holding means projecting yieldably radially from the head, and cam members having gripping surfaces protruding radially from the head and engaging the mandrel, the cam members being rotatably disposed in the head about an axis substantially parallel with the axis of the head.

2. A back-up tool for casings, comprising a tubular mandrel, a tubular head associated with and rotatable with respect to the mandrel, holding means projecting yieldably radially from the head, and cam members having gripping surfaces protruding radially from the head and engaging the mandrel, the cam members being rotatably disposed in the head about an axis substantially parallel with the axis of the head.

3. A back-up tool for casings, comprising a mandrel, a head associated with and rotatable with respect to the mandrel, holding means projecting yieldably radially from the head, and cam members having gripping surfaces protruding radially from the head and engaging the mandrel, the cam members being rotatably disposed in the head about an axis substantially parallel with the axis of the head, and means for yieldably forcing the cam members against the mandrel.

4. A back-up tool for casings, comprising a mandrel, a head associated with and rotatable with respect to the mandrel, holding means projecting yieldably radially from the head, cam members having gripping surfaces protruding radially from the head and engaging the mandrel, the cam members being rotatably disposed in the head about an axis substantially parallel with the axis of the head, and means for yieldably forcing the cam members against the mandrel, the cam members being toothed and the portions of the mandrel engaged by the cam members having a roughened surface.

WILLIAM OTHO BICKERSTAFF.